United States Patent
Qin

(10) Patent No.: US 9,046,905 B2
(45) Date of Patent: Jun. 2, 2015

(54) APPARATUS AND METHODS FOR BIDIRECTIONAL CURRENT SENSING IN A SWITCHING REGULATOR

(71) Applicant: ANALOG DEVICES GLOBAL, Hamilton (BM)

(72) Inventor: Song Qin, Shanghai (CN)

(73) Assignee: Analog Devices Global, Hamilton (BM)

( * ) Notice: Subject to any disclaimer, the term of this patent is extended or adjusted under 35 U.S.C. 154(b) by 214 days.

(21) Appl. No.: 13/791,234

(22) Filed: Mar. 8, 2013

(65) Prior Publication Data
US 2014/0253062 A1    Sep. 11, 2014

(51) Int. Cl.
G05F 1/618   (2006.01)
G05F 1/10   (2006.01)

(52) U.S. Cl.
CPC .................................. G05F 1/10 (2013.01)

(58) Field of Classification Search
CPC ... H02M 3/1588; H02M 3/156; H02M 3/158; H02M 3/1582; H02M 3/1584; H02M 3/157; H02M 3/33507; H02M 2001/0045; H02M 2001/0012; H02M 2001/0032; H02M 2001/0009; G05F 3/24; G05F 3/30; G05F 3/265; G05F 3/245; G05F 3/247; G05F 1/56; G05F 1/575
USPC .................. 323/265, 268, 271, 282–285, 314
See application file for complete search history.

(56) References Cited

U.S. PATENT DOCUMENTS

| | | | |
|---|---|---|---|
| 7,106,042 B1 | 9/2006 | Jackson | |
| 7,282,894 B2 * | 10/2007 | Oswald et al. | 323/224 |
| 7,319,314 B1 | 1/2008 | Maheshwari et al. | |
| 7,336,085 B2 | 2/2008 | Fabbro et al. | |
| 7,365,559 B2 | 4/2008 | Colbeck | |
| 8,080,984 B1 | 12/2011 | Geynet | |
| 8,159,204 B2 | 4/2012 | Grant | |
| 8,350,543 B2 * | 1/2013 | Loikkanen et al. | 323/259 |
| 8,373,398 B2 | 2/2013 | Kim | |
| 8,508,207 B2 * | 8/2013 | Burns et al. | 323/283 |
| 8,513,935 B2 * | 8/2013 | Brokaw | 323/285 |
| 8,680,836 B2 | 3/2014 | Grant | |
| 2004/0189351 A1 | 9/2004 | Tai et al. | |
| 2006/0255783 A1 | 11/2006 | Chapuis | |
| 2011/0101934 A1 * | 5/2011 | Lopata et al. | 323/271 |
| 2013/0293986 A1 | 11/2013 | Lerner et al. | |
| 2014/0009190 A1 | 1/2014 | Chao | |

OTHER PUBLICATIONS

Office Action dated Jun. 27, 2014 in U.S. Appl. No. 13/791,210 (8 pages).

* cited by examiner

Primary Examiner — Adolf Berhane
Assistant Examiner — Kevin H Sprenger
(74) Attorney, Agent, or Firm — Knobbe Martens Olson & Bear LLP

(57) ABSTRACT

Apparatus and methods for current sensing in switching regulators are provided. In certain implementations, a switching regulator includes a switch transistor, a replica transistor, a current source, a sense resistor, and a current sensing circuit. The drain and gate of the switch transistor can be electrically connected to the drain and gate of the replica transistor, respectively. Additionally, the current sensing circuit can control the voltage of the source of the replica transistor based on the polarity of a current through the switch transistor to generate an output current that changes in response to the switch transistor's current. The sense resistor can receive an offset current from the first current source and the output current from the current sensing circuit such that the voltage across the sense resistor changes in relation to the current through the switch transistor.

20 Claims, 6 Drawing Sheets

APPARATUS AND METHODS FOR BIDIRECTIONAL CURRENT SENSING IN A SWITCHING REGULATOR

CROSS-REFERENCE TO RELATED APPLICATIONS

This application is related to U.S. application Ser. No. 13/791,210, entitled "APPARATUS AND METHODS FOR SWITCHING REGULATOR CURRENT SENSING", filed on even date herewith), the disclosure of which is incorporated herein by reference in its entirety.

BACKGROUND

1. Field

Embodiments of the invention relate to electronic devices, and more particularly, to switching regulators.

2. Description of the Related Technology

A switching regulator can be used to generate a regulated voltage by controlling a current provided to a load through an inductor. For example, the switching regulator can include one or more switches that are turned on and off to control a current into or out of the inductor. The duty cycle and/or timing of the switches can control the voltage level of the regulated voltage. Examples of switching regulators include, for example, buck converters and boost converters.

A switching regulator can include current sensing or observation circuitry to sense the current through one or more of the regulator's switches, thereby sensing the current provided to the load through the inductor. The sensed switch current can be used to provide enhanced control over switching operations in the regulator.

There is a need for improved current sensing circuits in switching regulators.

SUMMARY

In one embodiment, an apparatus includes a first switch transistor, a replica transistor, a current sensing circuit, and a sense resistor. The first switch transistor includes a drain, a source, and a gate. The source is electrically connected to a first supply voltage, and the gate is electrically connected to a first control signal. The replica transistor includes a drain, a source, and a gate. The drain of the replica transistor is electrically connected to the drain of the first switch transistor, the gate of the replica transistor is electrically connected to the first control signal, and the replica transistor is a replica of the first switch transistor. The current sensing circuit is electrically connected to the drain of the first switch transistor and to the source of the replica transistor. The current sensing circuit is configured to generate an output current that varies in response to a sense current from a source of the replica transistor. The sense current is a replica of a switch current through the first switch transistor by controlling a voltage of the source of the replica transistor. The current sensing circuit is further configured to control the voltage of the source of the replica transistor to a first voltage level when the switch current has a first polarity, and to control the voltage of the source of the replica transistor to a second voltage level different than the first voltage level when the switch current has a second polarity opposite the first polarity. The sense resistor is configured to receive the output current from the current sensing circuit, and a voltage across the sense resistor is configured to change in relation to the switch current.

In another embodiment, an apparatus includes a first switch transistor, a replica transistor, a means for current sensing, and a sense resistor. The first switch transistor includes a drain, a source, and a gate. The source is electrically connected to a first supply voltage, and the gate is electrically connected to a first control signal. The replica transistor includes a drain, a source, and a gate. The drain of the replica transistor is electrically connected to the drain of the first switch transistor, and the gate of the replica transistor is electrically connected to the first control signal. The replica transistor is a replica of the first switch transistor. The current sensing means is electrically connected to the drain of the first switch transistor and to the source of the replica transistor. The current sensing means is configured to generate an output current that changes in response to a sense current from a source of the replica transistor. The sense current is a replica of a switch current through the first switch transistor by controlling a voltage of the source of the replica transistor. The current sensing means is further configured to control the voltage of the source of the replica transistor to a first voltage level when the switch current has a first polarity, and to control the voltage of the source of the replica transistor to a second voltage level different than the first voltage level when the switch current has a second polarity opposite the first polarity. The sense resistor is configured to receive the output current from the current sensing means. A voltage across the sense resistor is configured to change in relation to the switch current.

In another embodiment, a method of sensing a current in a switching regulator is provided. The method includes controlling a first switch transistor using a first control signal. The first switch transistor includes a drain, a source electrically connected to a first supply voltage, and a gate electrically connected to the first control signal. The method further includes controlling a voltage of the source of the replica transistor to a first voltage level using a current sensing circuit when a switch current through the first switch transistor has a first polarity. The method further includes controlling the voltage of the source of the replica transistor to a second voltage level using the current sensing circuit when the switch current has a second polarity opposite the first polarity. The second voltage level is different than the first voltage level. The method further includes generating an output current based on a sense current through the replica transistor.

DETAILED DESCRIPTION OF EMBODIMENTS

Figure 1:
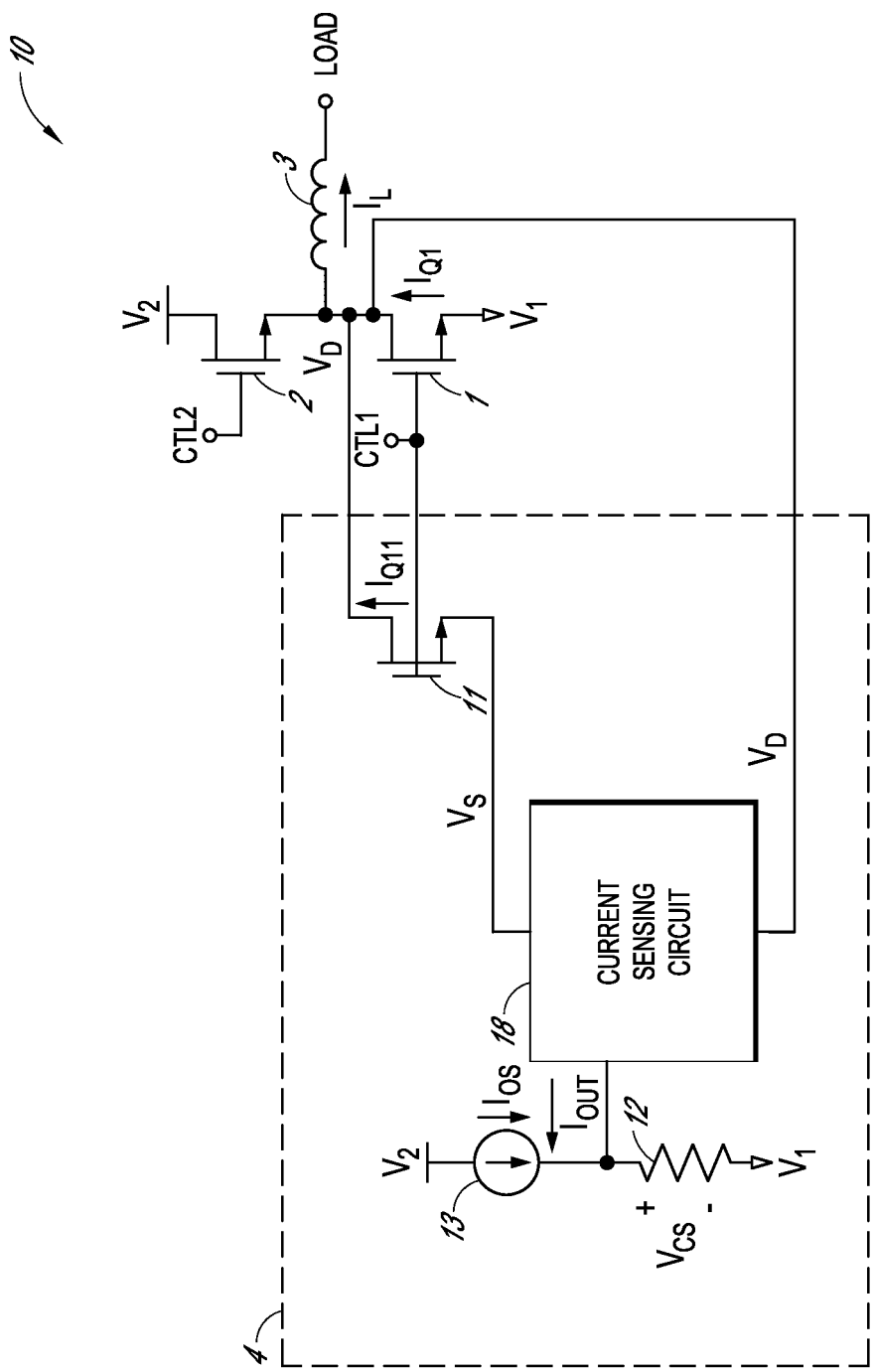
FIG. 1 is a circuit diagram of one embodiment of a switching regulator.

The following detailed description of embodiments presents various descriptions of specific embodiments of the invention. However, the invention can be embodied in a multitude of different ways as defined and covered by the claims.

In this description, reference is made to the drawings where like reference numerals may indicate identical or functionally similar elements.

Overview of Current Sensing Circuits in Switching Regulators

To sense a current through a switch transistor of a switching regulator, a replica transistor can be used to generate a sensed current that changes based on the current through the switch transistor. For example, the replica transistor can have a gate and a drain electrically connected to a gate and a drain of the switch transistor, respectively, and a drain-to-source current ($I_{DS}$) of the replica transistor can be used to generate the sensed current. In one embodiment, the replica transistor is a replica of the switch transistor such that, except for a possible difference in width, the replica transistor has about the same characteristics as the switch transistor.

The difficulty of current sensing in switching regulators can be exacerbated in configurations in which the polarity of the switch transistor's current changes over time. For example, the polarity of the switch current can be positive or negative depending on the regulator's load conditions. For instance, the switch current can be positive or from the source to the drain of the switch transistor for a relatively large or heavy current load, but can be negative or from the drain to the source at certain time instances for a relatively small or light current load. The positive and negative current polarities can lead to operating conditions in which the voltage of the drain of the switch transistor can be either above or below a power low or ground supply voltage of the switching regulator. Such operating conditions can complicate current sensing.

Additionally, current sensing can be further complicated when the switching regulator is fabricated using certain manufacturing processes. For example, when the switch transistor and the replica transistor are implemented as vertical diffusion metal oxide semiconductor (DMOS) transistors, the drains of the switch transistor and the replica transistor can be inherently connected in some manufacturing processes and/or layout implementations. Such inherent electrical connections can further constrain a current sensing circuit.

Apparatus and methods for current sensing in switching regulators are provided. In certain implementations, a switching regulator includes a switch transistor, a replica transistor, a current source, a sense resistor, and a current sensing circuit. The drain and gate of the switch transistor can be electrically connected to the drain and gate of the replica transistor, respectively. Additionally, the current sensing circuit can control the voltage of the source of the replica transistor based on the polarity of a current through the switch transistor to generate an output current that changes in response to the switch transistor's current. The sense resistor can receive an offset current from the current source and the output current from the current sensing circuit such that the voltage across the sense resistor changes in relation to the current through the switch transistor.

Additionally, the current sensing circuit can include a first terminal electrically connected to the source of the replica transistor and a second terminal electrically connected to the drains of the switch and replica transistors. The current sensing circuit can control a voltage of the source of the replica transistor to a first voltage level when the current through the switch transistor has a first or positive polarity. Additionally, the current sensing circuit can control the voltage of the source of the replica transistor to a second voltage level different the first voltage level when the current through the switch transistor has a second or negative polarity. Configuring the current sensing circuit to control the replica transistor's source voltage to different voltage levels depending on the polarity of the current through the switch transistor can aid in sensing the switch transistor's current even when the drain voltage of the switch transistor transitions between voltage values above and below that of the switching regulator's power low or ground supply.

The current sensing circuits described herein can be used to sense bidirectional currents through a switch transistor in a switching regulator. Additionally, the current sensing circuits can be configured to provide relatively robust switch current observations near current transition regions in which the switch current's polarity transitions from positive to negative or from negative to positive.

FIG. 1 is a schematic diagram of one embodiment of a switching regulator 10. The switching regulator 10 includes a first switch transistor 1, a second switch transistor 2, an inductor 3, and a current sensing block 4. The current sensing block 4 includes a replica transistor 11, a sense resistor 12, a first current source 13, and a current sensing circuit 18.

The first switch transistor 1 includes a gate configured to receive a first control signal CTL1, a source electrically connected to a first or power low supply voltage $V_1$, and a drain electrically connected to a first end of the inductor 3, to a source of the second switch transistor 2, and to a drain of the replica transistor 11. The inductor 3 further includes a second end electrically connected to a load terminal LOAD. The second switch transistor 2 further includes a gate configured to receive a second control signal CTL2 and a drain electrically connected to a second or power high supply voltage $V_2$. The replica transistor 11 further includes a gate configured to receive the first control signal CTL1. The current sensing circuit 18 includes a first terminal electrically connected to the source of the replica transistor 11 and a second terminal electrically connected to the drain of the first switch transistor 1. The first current source 13 is electrically connected between the second supply voltage $V_2$ and an output of the current sensing circuit 18. The sense resistor 12 is electrically connected between the output of the current sensing circuit 18 and the first supply voltage $V_1$. The first current source 13 is configured to generate a first or offset current $I_{OS}$, and the current sensing circuit 18 is configured to generate an output current $I_{OUT}$.

The first and second control signals CTL1, CTL2 can be used to turn on and off the first and second switch transistors 1, 2 to generate a regulated voltage on the load terminal LOAD by controlling an inductor current $I_L$ through the inductor 3. In certain implementations, the first and second control signals CTL1, CTL2 can be used to regularly switch the state of the first and second switch transistors 1, 2 between a first phase of the switching regulator 10 and a second phase of the switching regulator 10. For example, during the first phase of the switching regulator 10, the first switch transistor 1 can be off and the second switch transistor 2 can be on to increase or build up the magnetic field of the inductor 3 by providing a current from the second supply voltage $V_2$ to the load terminal LOAD through the inductor 3. Additionally, during the second phase of the switching regulator 10, the first switch transistor 1 can be on and the second switch transistor 2 can be off such that inductor's magnetic field operates to provide a current from the first supply voltage $V_1$ to the load terminal LOAD.

Although the switching regulator 10 has been described as operating over two phases, the switching regulator 10 can operate in other ways. For example, in one embodiment, the switching regulator 10 is switched between the first phase, the second phase, and a third phase associated with turning off the first and second switch transistors 1, 2. Configuring the switching regulator 10 in this manner can aid in controlling the voltage level of the regulated voltage generated on the load terminal LOAD when the current loading of the load terminal LOAD is relatively small or light. Although not illustrated in FIG. 1 for clarity, the switching regulator 10 can include switch control circuitry for generating the first and second control signals CTL1, CTL2. In certain implementations, the switch control circuitry can be configured to operate based in part on a current sensed by the current sensing block 4.

The current sensing block 4 can be used to sense a switch current $I_{Q1}$ of the first switch transistor 1, and thus can be used to sense the inductor current $I_L$ through the inductor 3 when the first switch transistor 1 is on and the second switch transistor 2 is off. For example, the sense resistor 12 has been configured to receive the offset current $I_{OS}$ from the first current source 13 and the output current $I_{OUT}$ from the current sensing circuit 18. Additionally, the current sensing circuit 18 can control the magnitude of the output current $I_{OUT}$ to change with the switch current $I_{Q1}$, such that a voltage $V_{CS}$ across the sense resistor 12 changes in relation to the switch current $I_{Q1}$. Thus, the current sensing block 4 can sense the inductor current $I_L$ by changing the voltage $V_{CS}$ across the sense resistor 12 in relation to the inductor current $I_L$ when the first switch transistor 1 is on and the second switch transistor 2 is off. Although FIG. 1 illustrates the output current $I_{OUT}$ flowing into the sense resistor 12, the output current $I_{OUT}$ can have either a positive or negative polarity depending on the polarity of the switch current $I_{Q1}$. Thus, the output current $I_{OUT}$ can flow into or out of the sense resistor 12 as the switch current $I_{Q1}$ changes.

Although FIG. 1 illustrates the current sensing block 4 in the context of a switching regulator implemented in a buck converter configuration, the teachings herein are applicable to other implementations of switching regulators, including, for example, boost converter configurations. Thus, the teachings herein are applicable to switching converters that generate not only a buck or step down voltage, but also to switching converters that generate a boost or step up voltage.

As shown in FIG. 1, the first switch transistor 1 can generate the switch current $I_{Q1}$ and the replica transistor 11 can generate a sense current $I_{Q11}$. In certain implementations, the replica transistor 11 is scaled in size or drive strength relative to the first switch transistor 1. For example, when the drain-to-source voltages of the first switch transistor 1 and the replica transistor 11 are about equal, and the first switch transistor 1 is implemented to be a factor of about N times a width of the replica transistor 11, the switch current $I_{Q1}$ can be about equal to $N*I_{Q11}$. In one embodiment, N is selected to be in the range of about 100 to about 100,000. However, other configurations are possible.

As will be described in detail further below, the current sensing circuit 18 can include feedback circuitry configured to control the source voltage $V_S$ of the replica transistor 11 such that the drain-to-source voltage of the replica transistor 11 is controlled relative to the drain-to-source voltage of the first switch transistor 1. Additionally, the current sensing circuit 18 can control the source voltage $V_S$ to a first voltage level when the switch current $I_{Q1}$ is positive and to a second voltage level when the switch current $I_{Q1}$ is negative. By controlling the source voltage $V_S$ of the replica transistor 11 in this manner, the current sensing circuit 18 can sense both positive and negative values of the switch current $I_{Q1}$.

In certain implementations, the current sensing circuit 18 is configured to control the source voltage $V_S$ to be about equal to the voltage of the first supply voltage $V_1$ when the switch current $I_{Q1}$ is positive or flowing from the source to drain of the first switch transistor 1. Thus, when the switch current $I_{Q1}$ is positive, the drain-to-source voltages of the replica transistor 11 and the first switch transistor 1 can be about equal. Additionally, when the switch current $I_{Q1}$ is negative or flowing from the drain to source of the first switch transistor 1, the current sensing circuit 18 can be configured to control the source voltage $V_S$ to be a voltage level above the voltage of the first supply voltage $V_1$.

In one embodiment, when the switch current $I_{Q1}$ is negative, the current sensing circuit 18 controls a drain-to-source voltage of the replica transistor 11 to be about a factor of (1−n) times a drain-to-source voltage of the first switch transistor 1, where n is a fraction or integer greater than 0. In certain implementations, the factor n is selected to be about equal to 2, such that drain-to-source voltage of the replica transistor 11 has a magnitude that is about equal to a magnitude of the drain-to-source voltage of the first switch transistor 1, but with an opposite polarity. However, other configurations are possible. For example, in certain implementations, the factor n is selected to be about equal to 0.5, such that the drain-to-source voltage of the replica transistor 11 has a magnitude that is about half that of the drain-to-source voltage of the first switch transistor 1 and with the same polarity.

The output current $I_{OUT}$ generated by the current sensing block 4 can be based on the sense current $I_{Q11}$ through the replica transistor 11. For example, in certain implementations the output current $I_{OUT}$ is controlled to be about equal to the sense current $I_{Q11}$ multiplied by a scaling factor, which can be greater than, less than, or equal to 1.

The sense resistor 12 is configured to receive the output current $I_{OUT}$, and thus the voltage $V_{CS}$ across the sense resistor 12 can change in relation to the switch current $I_{Q1}$. The sense resistor 12 has also been configured to receive an offset current $I_{OS}$ from the first current source 13. Configuring the sense resistor 12 to receive the offset current $I_{OS}$ can aid in generating a positive voltage $V_{CS}$ even when the output current $I_{OUT}$ has a negative amplitude.

In certain implementations, the first and second switch transistors 1, 2 and the replica transistor 11 are implemented as metal oxide semiconductor (MOS) transistors, such as vertical DMOS transistors. As used herein and as persons having ordinary skill in the art will appreciate, MOS transistors can have gates made out of materials that are not metals, such as polysilicon, and can have dielectric regions implemented not just with silicon oxide, but with other dielectrics, such as high-k dielectrics.

In FIG. 1, the first and second switch transistors 1, 2 and the replica transistor 11 are illustrated as n-type MOS (NMOS) transistors. However, the teachings herein are applicable to configurations using p-type MOS (PMOS) transistors and/or configurations using a combination of NMOS and PMOS transistors. For example, in certain implementations, the first switch transistor 1 can be implemented as an NMOS transistor and the second switch transistor 2 can be implemented as a PMOS transistor.

The sense resistor 12 can be implemented using a variety of configurations. For example, in certain implementations, the sense resistor 12 is implemented using passive structures, such as polysilicon structures. However, other configurations are possible, such as implementations in which the sense resistor 12 is implemented using active devices such as transistors biased to provide a desired resistance.

In one embodiment, the first and second switch transistors 1, 2 and the current sensing block 4 are implemented on an integrated circuit, and the inductor 3 is implemented external to the integrated circuit. However, other configurations are possible.

Figure 2:
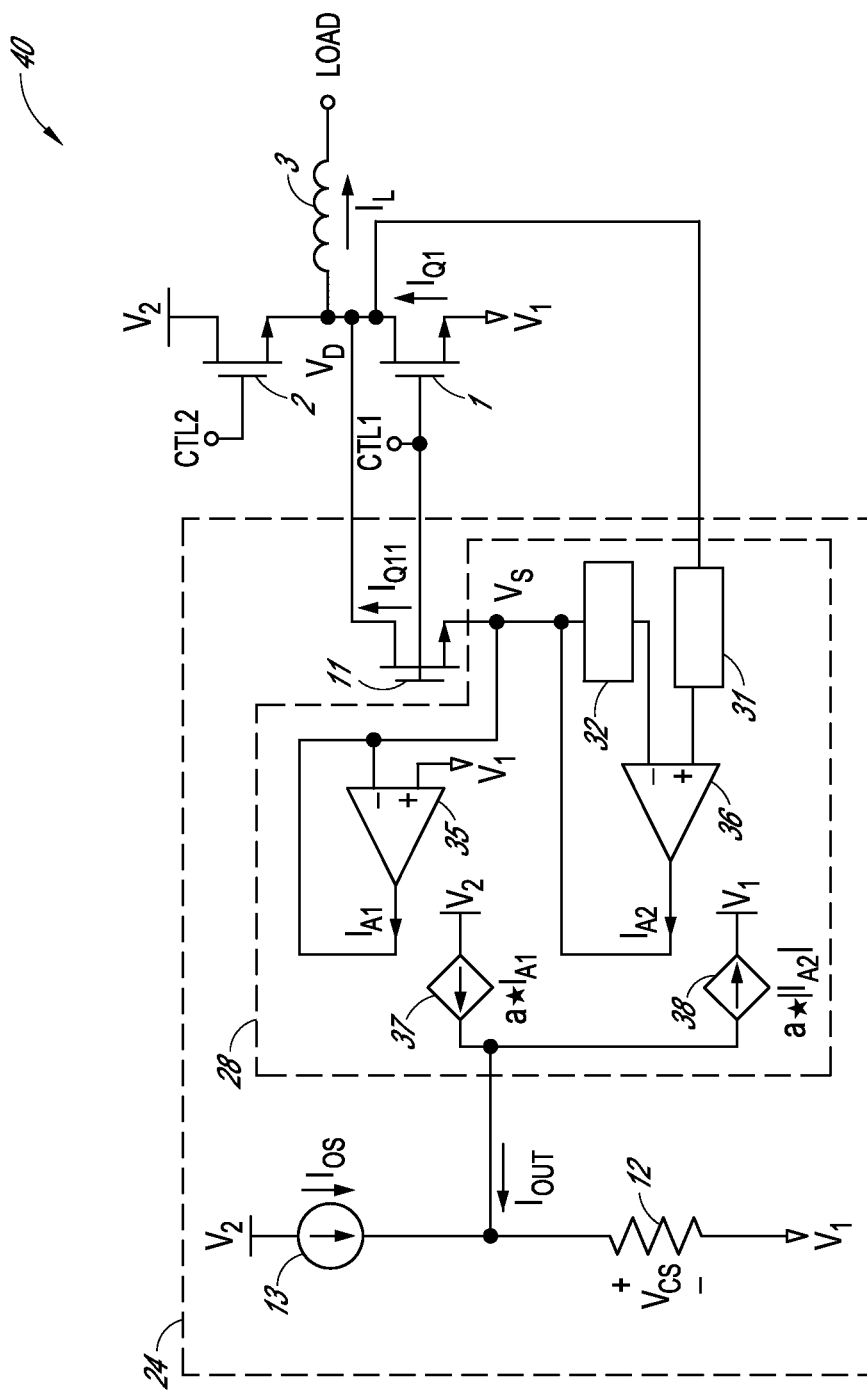
FIG. 2 is a circuit diagram of another embodiment of a switching regulator.

FIG. 2 is a circuit diagram of another embodiment of a switching regulator 40. The switching regulator 40 includes the first and second switch transistors 1, 2, the load inductor 3, and a current sensing block 24. The current sensing block 24 includes the replica transistor 11, the sense resistor 12, the first current source 13, and a current sensing circuit 28. The current sensing circuit 28 includes a first circuit network 31, a second circuit network 32, a first amplifier 35, a second amplifier 36, a second current source 37, and a third current source 38.

The first circuit network 31 is electrically connected between the drain of the first switch transistor 1 and the non-inverting input of the second amplifier 36. The second circuit network 32 is electrically connected between the source of the replica transistor 11 and an inverting input of the second amplifier 36. The second amplifier 36 further includes an output electrically connected to the source of the replica transistor 11. The first amplifier 35 includes a non-inverting input electrically connected to the first supply voltage $V_1$ and an inverting input and an output electrically connected to the source of the replica transistor 11. The first and second current sources 13, 37 are each electrically connected between second supply voltage $V_2$ and a first end of the sense resistor 12. The third current source 38 is electrically connected between the first supply voltage $V_1$. The sense resistor 12 further includes a second end electrically connected to the first supply voltage $V_1$. Although FIG. 2 illustrates a configuration in which the first and second current sources 13, 37 are powered using the second supply voltage $V_2$ and the third current source is powered using the first supply voltage $V_1$, other configurations are possible. For example, in one embodiment the first current source 13 is connected between the first end of the sense resistor 12 and an internal voltage reference, such as a regulated voltage generated by a low drop out (LDO) regulator.

The first and second amplifiers 35, 36 are configured to operate with negative feedback. For example, the output of the first amplifier 35 is electrically connected to the inverting input of the first amplifier 35, and the output of the second amplifier 36 is electrically connected to the inverting input of the second amplifier 36 using the second circuit network 32. Configuring the first and second amplifiers 35, 36 in this manner can result in each amplifier controlling the voltage of the amplifier's inverting input to be about equal to the amplifier's non-inverting input.

However, as will be described in detail further below, the negative feedback loop associated with the first amplifier 35 can be configured to be inactive when the switch current $I_{Q1}$ is negative or flowing from the drain to source of the first switch transistor 1, while the negative feedback loop associated with the second amplifier 36 can be configured to be inactive when the switch current $I_{Q1}$ is positive of flowing from the source to drain of the first switch transistor 1. Configuring the first and second amplifiers 35, 36 in this manner allows the first amplifier output current $I_{A1}$ to change in response to the switch current $I_{Q1}$ when the switch current $I_{Q1}$ is positive, and for the second amplifier output current $I_{A2}$ to change in response to the switch current $I_{Q1}$ when the switch current $I_{Q1}$ is negative.

The second and third current sources 37, 38 can operate as current-controlled current sources that generate currents that change in relation to the first and second amplifier output currents $I_{A1}$, $I_{A2}$, respectively. For example, the second current source 37 can generate a current about equal to $a*I_{A1}$ and the third current source 38 can generate a current about equal $a*|I_{A2}|$, where a is a scaling factor, which can be, for example, greater than, less than, or equal to 1. The currents generated by the first to third current sources 13, 37, 38 can be summed and provided to the sense resistor 12 to generate a voltage $V_{CS}$ across the sense resistor 12 that changes in response to the inductor current $I_L$ when the first switch transistor 1 is turned on and the second switch transistor 2 is turned off. In certain implementations, the second and third current sources 37, 38 can be implemented using current mirrors that mirror the output currents of the first and second amplifiers 35, 36, respectively. However, other configurations are possible.

In certain implementations the first and/or second circuit networks 31, 32 can include circuitry configured to generate an output voltage that is linearly related to the input voltage. For example, in one embodiment the first circuit network 31 is configured to generate an output voltage that is about equal to the source voltage $V_S$ of the replica transistor 11 multiplied by a factor $m_1$, and the second circuit network 32 is configured to generate an output voltage this about equal to the drain voltage $V_D$ of the replica transistor 11 multiplied by a factor $m_2$, where $m_1$ and $m_2$ are integer or fractional scaling factors, or a combination thereof. In certain implementations, the first and/or second circuit networks 31, 32 can be implemented using, for example, resistors configured as voltage dividers. In some implementations, the first and/or second circuit networks 31, 32 are omitted. For example, in one embodiment, the first circuit network 31 is omitted in favor of using a short circuit or direct electrical connection between the non-inverting input of the second amplifier 36 and the drain of the first switch transistor 1.

In the illustrated configuration, the second and third current sources 37, 38 have opposite polarity. The current from the second and third current sources 37, 38 can be summed to generate an output current $I_{OUT}$, which can be about equal to $a*(I_{A1}-|I_{A2}|)$. The output current $I_{OUT}$ can be added to the offset current $I_{OS}$ generated by the first current source 13, and provided to the sense resistor 12. Accordingly, the voltage $V_{CS}$ across the sense resistor 12 can be about equal to $R*(I_{OUT}+I_{OS})$, where R is the resistance of the sense resistor 12 and $I_{OS}$ is the offset current generated by the first current source 13.

As will be described below, the voltage $V_{CS}$ across the sense resistor 12 can change in relation to the switch current $I_{Q1}$, even when the switch current $I_{Q1}$ has an amplitude that changes between positive and negative current amplitudes over time.

The first output amplifier current $I_{A1}$ generated by the first amplifier 35 can change in relation to the switch current $I_{Q1}$ when the switch current $I_{Q1}$ is positive or flowing from source to drain of the first switch transistor 1, but can have a relatively small magnitude when the switch current $I_{Q1}$ is negative or flowing from drain to source of the first switch transistor 1. In one embodiment, the first and second amplifiers 35, 36 are powered from the second supply voltage $V_2$ and the first supply voltage $V_1$ or from the regulated output voltage and the first supply voltage $V_1$. For example, when the switch current $I_{Q1}$ is positive, the first amplifier 35 can source current to control a voltage $V_S$ of the first amplifier's inverting input to be about equal to $V_1$, where $V_1$ is the voltage level of the first supply voltage $V_1$. However, when the switch current $I_{Q1}$ is negative, the first amplifier 35 can be configured to have insufficient voltage headroom to sink current, and thus can be configured to be inoperable. Thus, when the switch current $I_{Q1}$ is negative, the first output amplifier current $I_{A1}$ can be relative small, such as a magnitude of about 0 mA. Accordingly, the first output amplifier current $I_{A1}$ can change in relation to the switch current $I_{Q1}$ when the switch current $I_{Q1}$ is positive, but can have a relatively small magnitude when the switch current $I_{Q1}$ is negative.

Additionally, the second output amplifier current $I_{A2}$ generated by the second amplifier 36 can change in relation to the switch current $I_{Q1}$ when the switch current $I_{Q1}$ is negative, but can have a relatively small magnitude when the switch current $I_{Q1}$ is positive. For example, the first circuit network 31 can generate an output voltage that is proportional to the drain voltage $V_D$ of the replica transistor 11. Thus, when the switch current $I_{Q1}$ is negative, the drain voltage $V_D$ can be positive, and the second amplifier 36 can have a voltage headroom sufficient to operate in negative feedback and to control the second amplifier current $I_{A2}$ to have a magnitude that changes in relation to the switch current $I_{Q1}$. However, when the switch current $I_{Q1}$ is positive, the drain voltage $V_D$ and the voltage of the second amplifier's non-inverting input can be negative, and the second amplifier 36 can have insufficient voltage headroom to control the voltage of the inverting input to about equal to the voltage of the non-inverting input. Thus, the second amplifier 36 can be configured to have insufficient voltage headroom to operate in negative feedback when the switch current $I_{Q1}$ is positive, and thus the second output amplifier current $I_{A2}$ can have a relatively small magnitude in this condition, such as a magnitude of about 0 mA.

Accordingly, the first output amplifier current $I_{A1}$ can change in response to the switch current $I_{Q1}$ when the switch current $I_{Q1}$ is positive, and the second output amplifier current $I_{AZ}$ can change in response to the switch current $I_{Q1}$ when the switch current $I_{Q1}$ is negative. Additionally, the second and third current sources 37, 38 can generate currents proportional to the first and second output amplifier currents $I_{A1}, I_{A2}$, respectively, which can be summed to generate an output current $I_{OUT}$ that flows into or out of the sense resistor 12 to control the voltage $V_{CS}$ across the sense resistor 12. Accordingly, the voltage $V_{CS}$ can change in relation to the switch current $I_{Q1}$, and thus also in relation to the inductor current $I_L$ when the first switch transistor 1 is turned on and the second switch transistor 2 is turned off.

The current through the sense resistor 12 can be equal to a sum of the currents of the first to third current sources 13, 37-38. However, as shown in FIG. 2, the polarity of the third current source 38 can be opposite the polarity of the first and second current sources 13, 37. Accordingly, in certain implementations, the voltage $V_{CS}$ across the sense resistor 12 can be given by equation 1 below, where a is the scaling factor of the second and third current sources 37, 38, R is the resistance of the sense resistor 12, and $I_{OS}$ is the current of the first current source 13.

$$V_{CS} \sim = R*[I_{OS}+a*I_{A1}-a*|I_{A2}|] \quad \text{Equation 1}$$

As described earlier, when the switch current $I_{Q1}$ is positive, the first amplifier 35 can control can control the source voltage $V_S$ to be about equal to the voltage of the first supply voltage $V_1$. Accordingly, in certain implementations, the sense current $I_{Q11}$ of the replica transistor 11 is given by equation 1 below, where N is the scaling ratio between the replica transistor 11 and the first switch transistor 1. Additionally, in certain implementations, when the switch current $I_{Q1}$ is positive, the second amplifier current $I_{A2}$ can be about equal to 0 mA, the first amplifier current $I_{A1}$ can be about equal to the sense current $I_{Q11}$ of the replica transistor 11, and the voltage $V_{CS}$ of the sense resistor 12 can be given by equation 3 below.

$$I_{Q11} \sim = \frac{I_{Q1}}{N}, \text{ for } I_{Q1} > 0 \quad \text{Equation 2}$$

$$V_{CS} \sim = R*\left[I_{OS}+a*\left(\frac{I_{Q1}}{N}\right)\right], \text{ for } I_{Q1} > 0 \quad \text{Equation 3}$$

Additionally, when the switch current $I_{Q1}$ is negative, the negative feedback loop associated with the second amplifier 36 can control the source voltage $V_S$ to a voltage that is based on circuit parameters associated with the first and second circuit networks 31, 32. In one embodiment, the first and second circuit networks 31, 32 are configured such that the second amplifier 36 controls a drain-to-source voltage of the replica transistor 11 to be about equal to a factor of 1–n times a drain-to-source voltage of the first switch transistor 1, where n is a fraction or integer greater than 0. In certain implementations, the factor n is selected to be greater than 1, such that the drain-to-source voltage of the replica transistor 11 has a polarity that is opposite to a polarity of the drain-to-source voltage of the first switch transistor 1. However, in other configurations, n is selected to be less than 1, such that the drain-to-source voltage of the replica transistor 11 and the drain-to-source voltage of the first switch transistor 1 have the same polarity. Thus, in certain implementations, the sense current $I_{Q11}$ of the replica transistor 11 is given by equation 4 below when the switch current $I_{Q1}$ is negative. Additionally, in certain implementations, when the switch current $I_{Q1}$ is negative, the first amplifier current $I_{A1}$ can be about equal to 0 mA, the second amplifier current $I_{A2}$ can be about equal to the sense current $I_{Q11}$ of the replica transistor 11, and the voltage $V_{CS}$ of the sense resistor 12 can be given by equation 5 below.

$$|I_{Q11}| \sim = \frac{|(1-n)*I_{Q1}|}{N}, \text{ for } I_{Q1} < 0 \quad \text{Equation 4}$$

$$V_{CS} \sim = R*\left[I_{OS}+a*\left(\frac{|(1-n)*I_{Q1}|}{N}\right)\right], \text{ for } I_{Q1} < 0 \quad \text{Equation 5}$$

As shown by equations 3 and 5 above, the voltage $V_{CS}$ across the sense resistor 12 can be configured to be in a linear relationship with the switch current $I_{Q1}$ of the first switch transistor 1. Since the switch current $I_{Q1}$ of the first switch transistor 1 can change with the inductor current $I_L$ when the first control signal CTL1 is enabled, the voltage $V_{CS}$ can be used sense the inductor current $I_L$. The current sensing block 24 can be used to sense bidirectional switch currents and can provide a relatively smooth transition between positive and negative current sensing.

Figure 3A:
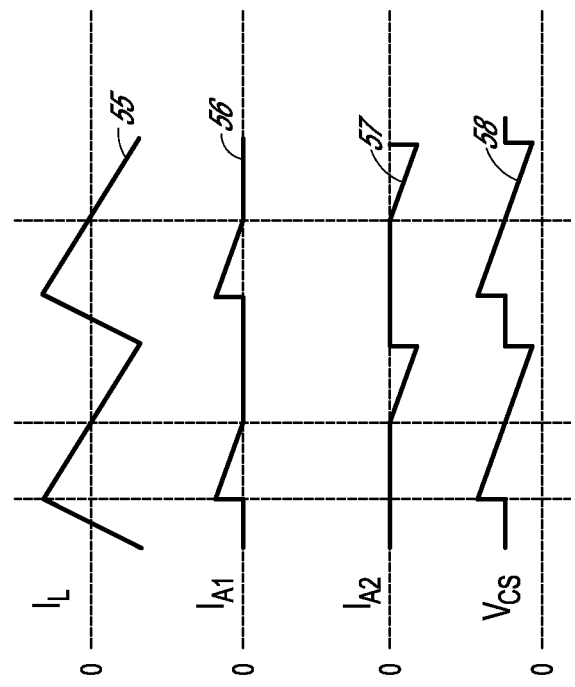
FIGS. 3A and 3B are graphs of voltage and current versus time for one implementation of the switching regulator of FIG. 2.
Figure 3B:
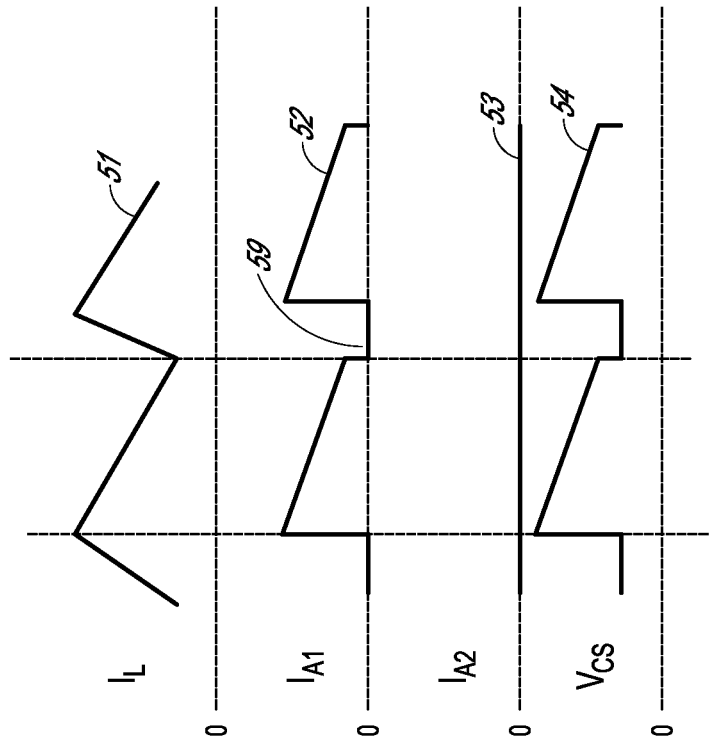

FIGS. 3A and 3B are graphs of voltage and current versus time for one implementation of the switching regulator 40 of FIG. 2. FIG. 3A corresponds to regulator operating conditions associated with positive inductor current, and includes a first plot 51 of the inductor current $I_L$ versus time, a second plot 52 of the first amplifier output current $I_{A1}$ versus time, a third plot 53 of the second amplifier output current $I_{A2}$ versus time, and a fourth plot of the voltage $V_{CS}$ versus time. FIG. 3B corresponds to regulator operating conditions associated with both positive and negative inductor currents, and includes a fifth plot 55 of the inductor current $I_L$ versus time, a sixth plot 56 of the first amplifier output current $I_{A1}$ versus time, a seventh plot 57 of the second amplifier output current $I_{A2}$ versus time, and an eighth plot of the voltage $V_{CS}$ versus time.

As shown in FIG. 3A, when the inductor current $I_L$ has a positive amplitude, the second amplifier output current $I_{A2}$ can be relatively small and the first amplifier output current $I_{A1}$ can change in relation to the inductor current $I_L$. Additionally, the voltage $V_{CS}$ can change in relation to the inductor current $I_L$. As shown in FIG. 3A, the second plot 52 includes certain regions, such as region 59, in which the first amplifier current $I_{A1}$ can be substantially constant even when the inductor current $I_L$ is changing. The region 59 can be associated with the first switch transistor 1 of FIG. 2 being turned off by the first control signal CTL1 during switching operations of the regulator.

As shown in FIG. 3B, when the inductor current $I_L$ has a positive amplitude, the second amplifier output current $I_{A2}$ can relatively small and the first amplifier output current $I_{A1}$ can change in relation to the inductor current $I_L$. Additionally, when the inductor current $I_L$ has a negative amplitude, the first amplifier output current $I_{A1}$ can be relatively small and the second amplifier output current $I_{A2}$ can change in relation to the inductor current $I_L$. Additionally, the sum of the first and second amplifier output current $I_{A1}$, $I_{A2}$ can be provided to the sense resistor 12 of FIG. 2, and thus the voltage $V_{CS}$ can change in relation to the inductor current $I_L$.

Although FIGS. 3A and 3B illustrate one example of graphs of voltage and current versus time for one implementation of the switching regulator 40 of FIG. 2, other configurations are possible.

Figure 4:
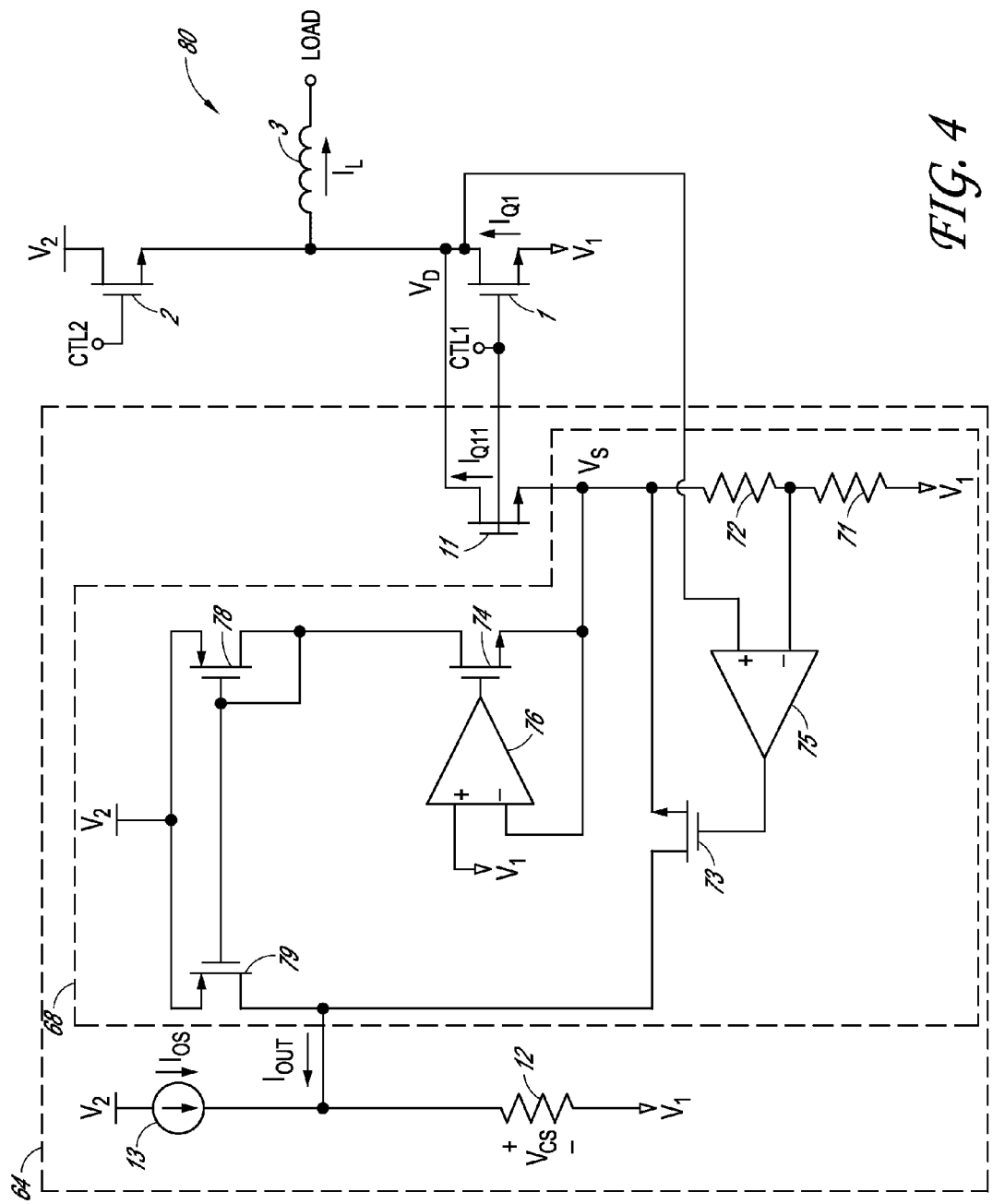
FIG. 4 is a circuit diagram of another embodiment of a switching regulator.

FIG. 4 is a circuit diagram of one embodiment of a switching regulator 80. The switching regulator 80 includes first and second switch transistors 1, 2, the load inductor 3, and a current sensing block 64. The current sensing block 64 includes the replica transistor 11, the sense resistor 12, the first current source 13, and a current sensing circuit 68, which includes first and second resistors 71, 72, first and second NMOS transistors 73, 74, first and second amplifiers 75, 76, and first and second PMOS transistors 78, 79.

The first current source 13 includes a first end electrically connected to the second supply voltage $V_2$ and a second end electrically connected to a first end of the sense resistor 12, to a drain of the first NMOS transistor 73, and to a drain of the second PMOS transistor 79. The sense resistor 12 further includes a second end electrically connected to the first supply voltage $V_1$. The first NMOS transistor 73 further includes a gate electrically connected to an output of the first amplifier 75 and a source electrically connected to a first end of the second resistor 72, to an inverting input of the second amplifier 76, to a source of the second NMOS transistor 74, and to a source of the replica transistor 11. The second resistor 72 further includes a second end electrically connected to an inverting input of the first amplifier 75 and to a first end of the first resistor 71. The first resistor 71 further includes a second end electrically connected to the first supply voltage $V_1$. The first amplifier 75 further includes a non-inverting input configured to receive the drain voltage $V_D$ from the first switch transistor 1. The second amplifier 76 further includes a non-inverting input electrically connected to the first supply voltage $V_1$ and an output electrically connected to a gate of the second NMOS transistor 74. The second NMOS transistor 74 further includes a drain electrically connected to a drain of the first PMOS transistor 78, to a gate of the first PMOS transistor 78, and to a gate of the second PMOS transistor 79. The first and second PMOS transistors 78, 79 each further include a source electrically connected to the second supply voltage $V_2$.

The current sensing block 64 can be used to generate the voltage $V_{CS}$ across the sense resistor 12 such that the voltage $V_{CS}$ changes in response to the switch current $I_{Q1}$ for both positive and negative amplitudes of the switch current $I_{Q1}$.

For example, when the switch current $I_{Q1}$ is positive or flowing from the source to drain of the first switch transistor 1, the second amplifier 76 and the second NMOS transistor 74 can be used to control the source voltage $V_S$ of the replica transistor 11 to be about equal to a voltage of the first supply voltage $V_1$ such that the drain-to-source voltages of the first switch transistor 1 and the replica transistor 11 are about equal. Additionally, the sense current $I_{Q11}$ can flow though the second NMOS transistor 74 and mirrored by the first and second PMOS transistors 78, 79, which operate as a current mirror, to generate the output current $I_{OUT}$. However, when the switch current $I_{Q1}$ is positive, the first NMOS transistor 73 can be turned off, since the first amplifier 75 can be configured to have insufficient output voltage swing to drive the gate of the first NMOS transistor 73 to a voltage below that of the first supply voltage $V_1$. Although the first and second PMOS transistors 78, 79 illustrate one example of a current mirror that can be used in the switching regulators described herein, other configurations are possible.

Additionally, when the switch current $I_{Q1}$ is negative or flowing from the drain to source of the first switch transistor 1, the first amplifier 75 and the first NMOS transistor 73 can be used to control the source voltage $V_S$ of the replica transistor 11 to a voltage determined by a resistance ratio of the first and second resistors 71, 72. In certain implementations, the first and second resistors 71, 72 are configured to have about equal resistances such that the first amplifier 75 and the first NMOS transistor 73 control the voltage across each resistor to be about equal to the drain-to-source voltage of the first switch transistor 1. In such a configuration, the drain-to-source voltage of the replica transistor 11 can have about equal magnitude but opposite polarity as the drain-to-source voltage of the first switch transistor 1. Additionally, the sense current $I_{Q11}$ can flow though the first NMOS transistor 73 to generate the output current $I_{OUT}$. However, when the switch current $I_{Q1}$ is negative, the second NMOS transistor 74 can be turned off, since the second NMOS transistor 74 have been configured to source but not to sink current to the node $V_S$.

Although an implementation of a switching regulator with equal resistances for the first and second resistors 71, 72 has been described above, other configurations can be used. Additional details of the switching regulator 80 can be similar to those described earlier.

Figure 5:
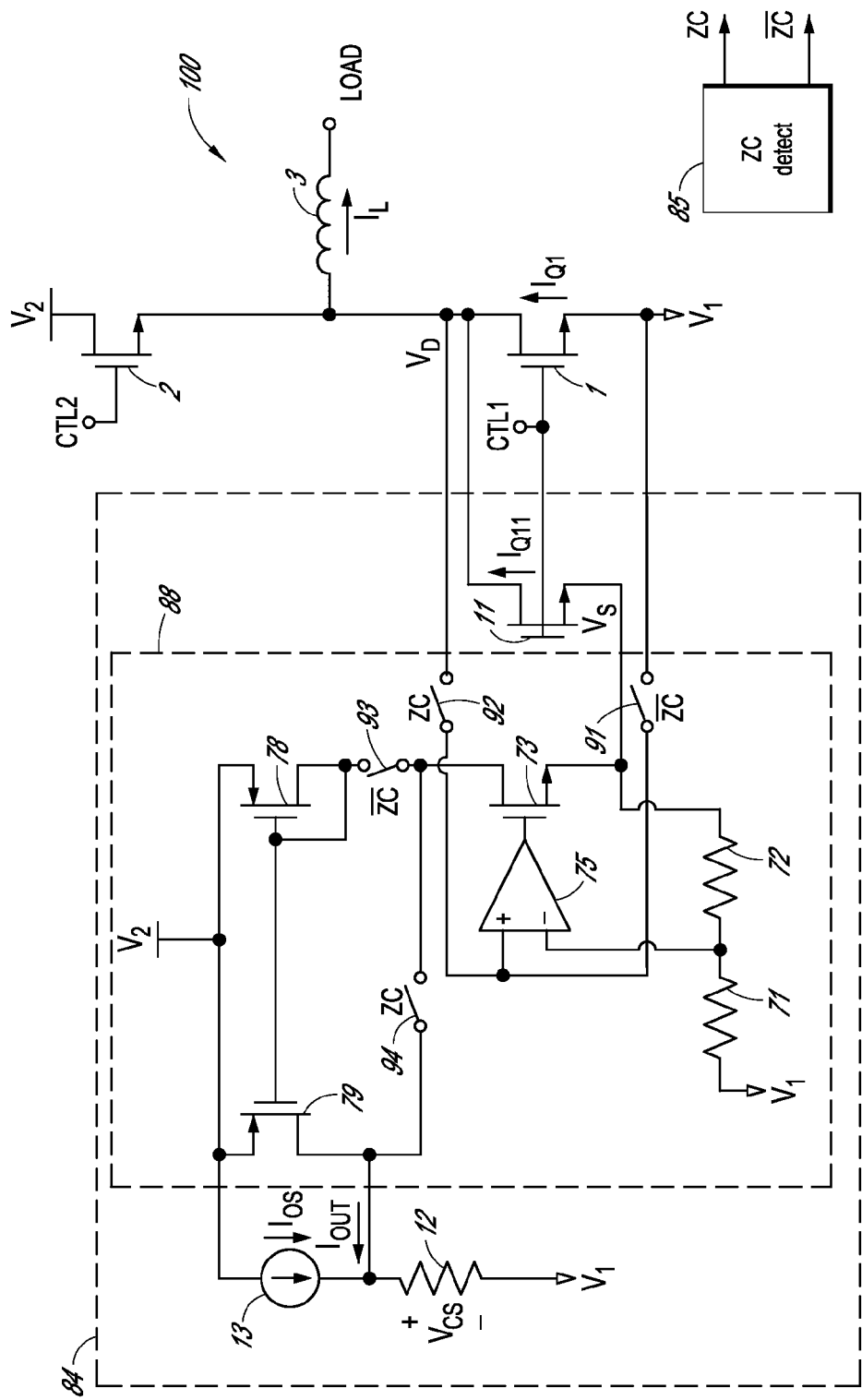
FIG. 5 is a circuit diagram of another embodiment of a switching regulator.

FIG. 5 is a circuit diagram of another embodiment of a switching regulator 100. The switching regulator 100 includes the first and second switch transistors 1, 2, the load inductor 3, a current sensing block 84, and a zero-cross detection circuit 85. The current sensing block 84 includes the replica transistor 11, the sense resistor 12, the first current source 13, and a current sensing circuit 88, which includes the first and second resistors 71, 72, the first NMOS transistor 73, the first amplifier 75, the first and second PMOS transistors 78, 79, and first to fourth switches 91-94.

The zero-cross detection circuit 85 is configured to generate a first or non-inverted zero-cross control signal and a second or inverted zero-cross control signal. The non-inverted zero-cross control signal can indicate that the inductor current $I_L$ is negative or flowing out of the load terminal LOAD, while the inverted zero-cross control signal can indicate that the inductor current $I_L$ is positive or flowing into the load terminal LOAD.

The first current source 13 includes a first end electrically connected to the second supply voltage $V_2$ and a second end electrically connected to a first end of the sense resistor 12, to a drain of the second PMOS transistor 79, and to a first end of the fourth switch 94. The sense resistor 12 further includes a second end electrically connected to the first supply voltage $V_1$. The fourth switch 94 further includes a control input configured to receive the non-inverted zero-cross control signal and a second end electrically connected to a drain of the first NMOS transistor 73 and to a first end of the third switch 93. The third switch 93 further includes a control input configured to receive the inverted zero-cross control signal and a second end electrically connected to a drain of the first PMOS transistor 78, to a gate of the first PMOS transistor 78, and to a gate of the second PMOS transistor 79. The first and second PMOS transistors 78, 79 each further include a source electrically connected to the second supply voltage $V_2$. The first NMOS transistor 73 further includes a gate electrically connected to an output of the first amplifier 75 and a source electrically connected to a first end of the second resistor 72 and to a source of the replica transistor 11. The second resistor 72 further includes a second end electrically connected to an inverting input of the first amplifier 75 and to a first end of the first resistor 71. The first resistor 71 further includes a second end electrically connected to the first supply voltage $V_1$. The first amplifier 75 further includes a non-inverting input electrically connected to a first end of the first switch 91 and to a first end of the second switch 92. The first switch 91 further includes a second end electrically connected to the first supply voltage $V_1$ and a control input configured to receive the inverted zero-cross control signal. The second switch 92 further includes a second end configured to receive the drain voltage $V_D$ from the first switch transistor 1 and a control input configured to receive the non-inverted zero-cross control signal.

As persons having ordinary skill in the art will appreciate, the zero-cross detection circuit 85 can be included in a switching regulator to control the timing of the regulator's switching operations. In the configuration illustrated in FIG. 5, the zero-cross detection circuit 85 has been advantageously used to also control the first to fourth switches 91-94 of the current sensing block 84 so as to reduce a number of amplifiers used in the current sensing block 84 of FIG. 5 relative to the current sensing block 64 of FIG. 4.

For example, when the switch current $I_{Q1}$ is positive, the second and fourth switches 92, 94 can be opened or turned off and the first and third switches 91, 93 can be closed or turned on, thereby electrically connecting the first amplifier's non-inverting input to the first supply voltage $V_1$ and electrically connecting the drain of the first NMOS transistor 73 to the gate and drain of the first PMOS transistor 78 and to the gate of the second PMOS transistor 79. Thus, when the switch current $I_{Q1}$ is positive, the first amplifier 75 and the first NMOS transistor 73 can be used to control the source voltage $V_S$ of the replica transistor 11 to be about equal to a voltage of the first supply voltage $V_1$, such that the sense current $I_{Q11}$ changes in relation to the switch current $I_{Q1}$. Additionally, the sense current $I_{Q11}$ can flow though the first NMOS transistor 73 and can be mirrored by the first and second PMOS transistors 78, 79 to generate the output current $I_{OUT}$.

However, when the switch current $I_{Q1}$ is negative, the first and third switches 91, 93 can be opened and the second and fourth switches 92, 94 can be closed, thereby electrically connecting the first amplifier's non-inverting input to the drain voltage $V_D$ and electrically connecting the drain of the first NMOS transistor 73 to the first end of the sense resistor 12. In this operating condition, the first amplifier 75 and the first NMOS transistor 73 can be used to control the source voltage $V_S$ of the replica transistor 11 to a voltage determined by the resistances of the first and second resistors 71, 72. In certain implementations, the first and second resistors 71, 72 are configured to have about equal resistances such that the first amplifier 75 and the first NMOS transistor 73 control the source voltage $V_S$ to be about twice that of the drain voltage $V_D$, such that the drain-to-source voltage of the replica transistor 11 is about equal in magnitude but opposite in polarity compared to the drain-to-source voltage of the first switch transistor 1. Accordingly, when the switch current $I_{Q1}$ is positive, the sense current $I_{Q11}$ can flow though the first NMOS transistor 73 to generate the output current $I_{OUT}$.

Additional details of the switching regulator 100 of FIG. 5 can be similar to those described earlier.

Figure 6:
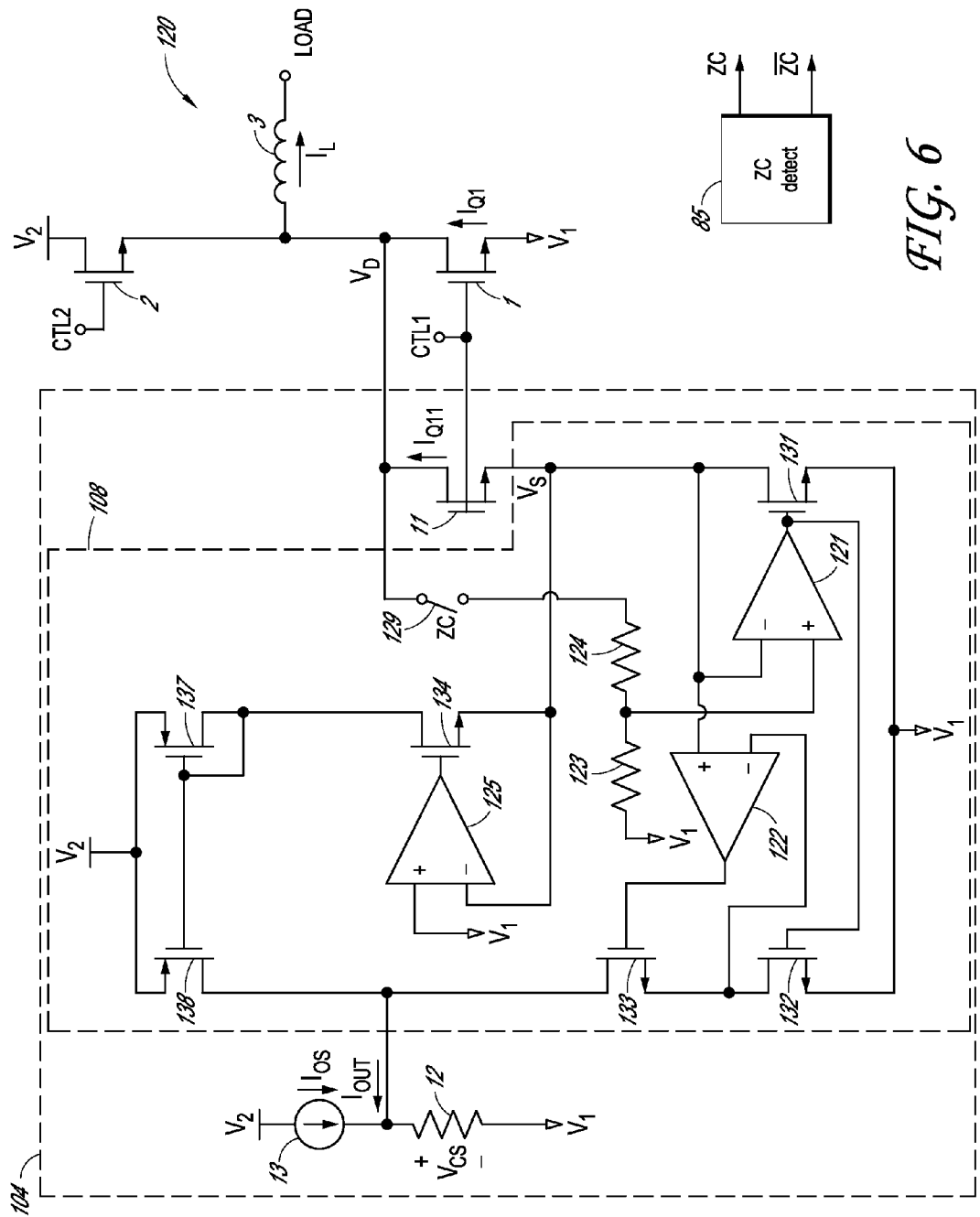
FIG. 6 is a circuit diagram of another embodiment of a switching regulator.

FIG. 6 is a circuit diagram of another embodiment of a switching regulator 120. The switching regulator 120 includes the first and second switch transistors 1, 2, the load inductor 3, a current sensing block 104, and the zero-cross detection circuit 85. The current sensing block 104 includes the replica transistor 11, the sense resistor 12, the first current source 13, and a current sensing circuit 108, which includes a switch 129, a first amplifier 121, a second amplifier 122, a first resistor 123, a second resistor 124, a third amplifier 125, a first NMOS transistor 131, a second NMOS transistor 132, a third NMOS transistor 133, a fourth NMOS transistor 134, a first PMOS transistor 137, and a second PMOS transistor 138.

The first current source 13 includes a first end electrically connected to the second supply voltage $V_2$ and a second end electrically connected to a first end of the sense resistor 12, to a drain of the second PMOS transistor 138, and to a drain of the third NMOS transistor 133. The sense resistor 12 further includes a second end electrically connected to the first supply voltage $V_1$. The second PMOS transistor 138 further includes gate electrically connected to a gate and drain of the first PMOS transistor 137 and to a drain of the fourth NMOS transistor 134. The first and second PMOS transistors 137, 138 each further each further include a source electrically connected to the second supply voltage $V_2$. The fourth NMOS transistor 134 further includes a gate electrically connected to an output of the third amplifier 125 and a source electrically connected to the source of the replica transistor 11, to a drain of the first NMOS transistor 131, to an inverting input of the first amplifier 121, to non-inverting input of the second amplifier 122, and to an inverting input of the third amplifier 125. The third amplifier 125 further includes a non-inverting input electrically connected to the first supply voltage $V_1$.

The first NMOS transistor 131 further includes a source electrically connected to the first supply voltage $V_1$ and a gate electrically connected to an output of the first amplifier 121 and to a gate of the second NMOS transistor 132. The second NMOS transistor 132 further includes a source electrically connected to the first supply voltage $V_1$ and a drain electrically connected to an inverting input of the second amplifier 122 and to a source of the third NMOS transistor 133. The third NMOS transistor 133 further includes a gate electrically connected to an output of the second amplifier 122. The first resistor 123 includes a first end electrically connected to the first supply voltage $V_1$ and a second end electrically connected to a non-inverting input of the first amplifier 121 and to a first end of the second resistor 124. The second resistor 124 further includes a second end electrically connected to a first end of the switch 129. The switch 129 further includes a control input configured to receive the non-inverted zero-cross control signal and a second end configured to receive the drain voltage $V_D$ from the first switch transistor 1.

When the switch current $I_{Q1}$ is positive, the switch 129 can be opened and the third amplifier 125 and the fourth NMOS transistor 134 can be used to control the source voltage $V_S$ of the replica transistor 11 to be about equal to a voltage of the first supply voltage $V_1$, such that the sense current $I_{Q11}$ changes in relation to the switch current $I_{Q1}$. The sense current $I_{Q11}$ can flow though the fourth NMOS transistor 134 and can be mirrored by the first and second PMOS transistors 137, 138 to generate the output current $I_{OUT}$.

Additionally, when the switch current $I_{Q1}$ is negative, the switch 129 can be closed and the first amplifier 121 and the first NMOS transistor 131 can control the source voltage $V_S$ to a voltage that depends on a resistance ratio of the first and second resistors 123, 124. For example, in a configuration in which the first and second resistors 123, 124 are about equal, the first amplifier 121 and the first NMOS transistor 131 can control the source voltage $V_S$ to be about equal to half the drain voltage $V_D$. Additionally, the non-inverting input of the second amplifier 122 is configured to receive the source voltage $V_S$, and thus the second amplifier 122 and the third NMOS transistor 133 can be used to control the inverting input of the second amplifier 122 to be about equal to the source voltage $V_S$ such that the drain-to-source voltages of the first and second NMOS transistors 131, 132 are about equal. Accordingly, the output current $I_{OUT}$ can change in relation to the switch current $I_{Q1}$ based on the resistor ratio of the first and second resistors 123, 124, the scaling ratio between the first switch transistor 1 and the replica transistor 11, and/or the scaling ratio between the first and second NMOS transistors 131, 132.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Applications

Devices employing the above described schemes can be implemented into various electronic devices. Examples of the electronic devices can include, but are not limited to, consumer electronic products, parts of the consumer electronic products, electronic test equipment, medical electronic products, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. The medical electronic products can include, but are not limited to, a Digital-X-ray detector, a CT (Computed Tomography) scanner, an Ultrasounds system, a MRI (Magnetic Resonance Imaging) system, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
    a first switch transistor including a drain, a source, and a gate, wherein the source is electrically connected to a first supply voltage, and wherein the gate is electrically connected to a first control signal;
    a replica transistor including a drain, a source, and a gate, wherein the drain of the replica transistor is electrically connected to the drain of the first switch transistor, wherein the gate of the replica transistor is electrically connected to the first control signal, and wherein the replica transistor is a replica of the first switch transistor;
    a current sensing circuit electrically connected to the drain of the first switch transistor and to the source of the replica transistor, wherein the current sensing circuit is configured to generate an output current that varies in response to a sense current from a source of the replica transistor, wherein the sense current is a replica of a switch current through the first switch transistor by controlling a voltage of the source of the replica transistor, wherein the current sensing circuit is further configured to control the voltage of the source of the replica transistor to a first voltage level when the switch current has a first polarity, and wherein the current sensing circuit is further configured to control the voltage of the source of the replica transistor to a second voltage level different than the first voltage level when the switch current has a second polarity opposite the first polarity; and
    a sense resistor configured to receive the output current from the current sensing circuit, wherein a voltage across the sense resistor is configured to change in relation to the switch current.

2. The apparatus of claim 1, further comprising:
    a first current source configured to generate an offset current, wherein the sense resistor is further configured to receive the offset current from the first current source.

3. The apparatus of claim 1, wherein the current sensing circuit comprises:
    a first amplifier including a first input, a second input, and an output, wherein the first input is electrically connected to the first supply voltage, and wherein the second input and the output are electrically connected to the source of the replica transistor; and
    a second amplifier including a first input, a second input, and an output, wherein the first input is electrically connected to the drain of the first switch transistor and to the drain of the replica transistor, and wherein the second input and the output are electrically connected to the source of the replica transistor,
    wherein the first amplifier is configured to control the voltage of the source of the replica transistor to the first voltage level when the switch current has the first polarity, and
    wherein the second amplifier is configured to control the voltage of the source of the replica transistor to the second voltage level when the switch current has the second polarity.

4. The apparatus of claim 3, wherein the current sensing circuit further comprises:
    a first voltage divider resistor electrically connected in a first electrical path between the output of the second amplifier and the second input of the second amplifier; and
    a second voltage divider resistor electrically connected in a second electrical path between the second input of the second amplifier and the first supply voltage,
    wherein a ratio of resistance between the first and second voltage divider resistors is configured to control the second voltage level.

5. The apparatus of claim 4, further comprising:
a first current source configured to generate a first current source current that changes in relation to a first amplifier current from the output of the first amplifier; and
a second current source configured to generate a second current source current that changes in relation to a second amplifier current from the output of the second amplifier,
wherein the first and second current source currents are summed to generate the output current of the current sensing circuit.

6. The apparatus of claim 1, wherein the first voltage level is about equal to a voltage level of the first supply voltage, and wherein the second voltage level is greater than a voltage level of the first supply voltage.

7. The apparatus of claim 1, wherein the current sensing circuit is further configured to control a drain-to-source voltage of the replica transistor to be about equal to a drain-to-source voltage of the first switch transistor when the switch current has the first polarity, and wherein the current sensing circuit is further configured to control the drain-to-source voltage of the replica transistor to be about equal in magnitude but opposite in polarity to the drain-to-source voltage of the first switch transistor when the switch current has the second polarity.

8. The apparatus of claim 1, further comprising:
a second switch transistor including a drain, a source, and a gate, wherein the source of the second switch transistor is electrically connected to the drain of the first switch transistor, wherein the drain of the second switch transistor is electrically connected to a second supply voltage, and wherein the gate of the second switch transistor is electrically connected to a second control signal.

9. The apparatus of claim 1, further comprising:
an inductor electrically connected between a load terminal and the drain of the first switch transistor.

10. The apparatus of claim 1, wherein the current sensing circuit comprises:
a first amplifier including a first input, a second input, and an output;
a first voltage divider resistor electrically connected between the second input of the first amplifier and the first supply voltage,
a second voltage divider resistor electrically connected between the second input of the first amplifier and the source of the replica transistor; and
a first n-type metal oxide semiconductor (NMOS) transistor including a gate electrically connected to the output of the first amplifier and a source electrically connected to the source of the replica transistor.

11. The apparatus of claim 10, wherein the current sensing circuit further comprises:
a current mirror including an input and an output, wherein the sense resistor is electrically connected in a first electrical path between the output of the current mirror and the first supply voltage;
a first control switch electrically connected in a second electrical path between the first input of the first amplifier and the first supply voltage;
a second control switch electrically connected in a third electrical path between the first input of the first amplifier and the drain of the first switch transistor,
a third control switch electrically connected in a fourth electrical path between a drain of the first NMOS transistor and an input of the current mirror; and
a fourth control switch electrically connected in a fifth electrical path between the drain of the first NMOS transistor and the output of the current mirror,
wherein the first and third switches are configured to turn on when the switch current has the first polarity and to turn off when the switch current has the second polarity, and wherein the second and fourth switches are configured to turn on when the switch current has the second polarity and to turn off when the switch current has the first polarity.

12. The apparatus of claim 10, wherein the current sensing circuit further comprises:
a current mirror including an input and an output, wherein the sense resistor is electrically connected between the output of the current mirror and the first supply voltage;
a second amplifier including a first input, a second input, and an output;
a second NMOS transistor including a drain, a source, and a gate, wherein the gate of the second NMOS transistor is electrically connected to the output of the second amplifier, wherein the source of the second NMOS transistor is electrically connected to the source of the replica transistor, and wherein the drain of the second NMOS transistor is electrically connected to the input of the current mirror, and
wherein the first input of the second amplifier is electrically connected to the first supply voltage, wherein the second input of the second amplifier is electrically connected to the source of the replica transistor, and wherein the first input of the first amplifier is electrically connected to the drain of the first switch transistor.

13. The apparatus of claim 1, wherein the current sensing circuit comprises:
a first amplifier including a first input, a second input, and an output, wherein the second input is electrically connected to the source of the replica transistor;
a first NMOS transistor including a drain electrically connected to the source of the replica transistor, a source electrically connected to the first supply voltage, and a gate electrically connected to the output of the first amplifier;
a first voltage divider resistor electrically connected between the second input of the first amplifier and first supply voltage,
a control switch;
a second voltage divider resistor, wherein the control switch and the second voltage divider resistor are electrically connected in series between the drain of the first switch transistor and the first input of the first amplifier;
a second amplifier including a first input, a second input, and an output, wherein the first input is electrically connected to the source of the replica transistor;
a second NMOS transistor including a drain electrically connected to the second input of the second amplifier, a source electrically connected to the first supply voltage, and a gate electrically connected to the output of the first amplifier; and
a third NMOS transistor including a drain, a source electrically connected to the second input of the second amplifier, and a gate electrically connected to the output of the second amplifier, wherein the sense resistor is electrically connected between the drain of the third NMOS transistor and the first supply voltage,
wherein the control switch is configured to turn on when the switch current has the second polarity and to turn off when the switch current has the first polarity.

14. The apparatus of claim 13, wherein the current sensing circuit further comprises:
- a third amplifier including a first input, a second input, and an output, wherein the first input is electrically connected to the first supply voltage, and wherein the second input is electrically connected to the source of the replica transistor;
- a fourth NMOS transistor including a drain, a source electrically connected to the source of the replica transistor, and a gate electrically connected to the output of the third amplifier; and
- a current mirror including an input electrically connected to the drain of the fourth NMOS transistor and an output electrically connected to the drain of the third NMOS transistor.

15. An apparatus comprising:
- a first switch transistor including a drain, a source, and a gate, wherein the source is electrically connected to a first supply voltage, and wherein the gate is electrically connected to a first control signal;
- a replica transistor including a drain, a source and a gate, wherein the drain of the replica transistor is electrically connected to the drain of the first switch transistor, wherein the gate of the replica transistor is electrically connected to the first control signal, and wherein the replica transistor is a replica of the first switch transistor;
- a means for current sensing electrically connected to the drain of the first switch transistor and to the source of the replica transistor, wherein the current sensing means is configured to generate an output current that changes in response to a sense current from a source of the replica transistor, wherein the sense current is a replica of a switch current through the first switch transistor by controlling a voltage of the source of the replica transistor, wherein the current sensing means is further configured to control the voltage of the source of the replica transistor to a first voltage level when the switch current has a first polarity, and wherein the current sensing means is further configured to control the voltage of the source of the replica transistor to a second voltage level different than the first voltage level when the switch current has a second polarity opposite the first polarity; and
- a sense resistor configured to receive the output current from the current sensing means, wherein a voltage across the sense resistor is configured to change in relation to the switch current.

16. The apparatus of claim 15, wherein the first voltage level is about equal to a voltage level of the first supply voltage, and wherein the second voltage level is greater than a voltage level of the first supply voltage.

17. A method of sensing a current in a switching regulator, the method comprising:
- controlling a first switch transistor using a first control signal, wherein the first switch transistor includes a drain, a source electrically connected to a first supply voltage, and a gate electrically connected to the first control signal;
- controlling a voltage of the source of the replica transistor to a first voltage level using a current sensing circuit when a switch current through the first switch transistor has a first polarity;
- controlling the voltage of the source of the replica transistor to a second voltage level using the current sensing circuit when the switch current has a second polarity opposite the first polarity, wherein the second voltage level is different than the first voltage level; and
- generating an output current based on a sense current through the replica transistor.

18. The method of claim 17, further comprising:
generating a sense voltage across a sense resistor using the output current.

19. The method of claim 18, further comprising:
generating an offset current using a first current source; and
providing the offset current to the sense resistor to shift a voltage level of the sense voltage.

20. The method of claim 18, wherein the first voltage level is about equal to a voltage level of the first supply voltage, and wherein the second voltage level is greater than a voltage level of the first supply voltage.

* * * * *